United States Patent [19]

Limouzin

[11] Patent Number: 5,128,095
[45] Date of Patent: Jul. 7, 1992

[54] GRAB FOR LIFTING AND DISPLACING AN OBJECT BETWEEN A POSITION SUBMERGED IN A HOT LIQUID, SUCH AS METAL, AND A POSITION EMERGED IN GAS

[75] Inventor: Dominique Limouzin, Lyons, France

[73] Assignee: Framatome, Courbevoie, France

[21] Appl. No.: 658,323

[22] Filed: Feb. 20, 1991

[30] Foreign Application Priority Data

Feb. 20, 1990 [FR] France ............... 90 02046

[51] Int. Cl.⁵ .......................................... G21C 19/105
[52] U.S. Cl. .................... 376/271; 294/86.25; 294/906
[58] Field of Search ............... 376/271, 268, 264, 262; 976/DIG. 252, DIG. 246, DIG. 245; 294/906, 86.25, 86.24, 95

[56] References Cited

U.S. PATENT DOCUMENTS

| 3,883,012 | 5/1975 | Jones | 376/264 |
| 4,236,966 | 12/1980 | Savin et al. | 376/271 |
| 4,259,153 | 3/1981 | Pryamilov et al. | 376/262 |
| 4,713,210 | 12/1987 | Germer | 376/262 |

FOREIGN PATENT DOCUMENTS 2431907 2/1980 France.

Primary Examiner—Daniel D. Wasil
Attorney, Agent, or Firm—Pollock, Vande Sande & Priddy

[57] ABSTRACT

The grab (1) comprises a tubular body (2) connected to a lifting means and a slide (3) mounted axially movably in the tubular body (2), so as to ensure the actuation of gripping pawls (20) carried by the tubular body (2). The tubular body (2) has a bell-shaped open end part (16), within which the slide (3) is connected to the inner surface of the tubular body over its entire periphery by means of an axially deformable gas-tight elastic member (30). The gripping pawls (20) are arranged within the bell-shaped end part (16) of the tubular element between the elastic member (30) ensuring its closure and its open end (16a). During the introduction of the lower part of the tubular body (2) into the liquid metal (8) in order to carry out the pick-up and displacement of an object (15), gas is trapped inside the bell (16) and forms a reserve, in which the gripping pawls (20) and their control means are located during the pick-up and displacement of the object (15) below the level (8a) of the liquid metal.

7 Claims, 2 Drawing Sheets

GRAB FOR LIFTING AND DISPLACING AN OBJECT BETWEEN A POSITION SUBMERGED IN A HOT LIQUID, SUCH AS METAL, AND A POSITION EMERGED IN GAS

FIELD OF THE INVENTION

The invention relates to a grab for lifting and displacing a fuel assembly between a position submerged in a liquid metal, such as sodium, and a position emerged in a cold gas or any other object between a position submerged in a liquid metal or other hot liquid, such as a bath of melted salts, and a position emerged in a gas.

BACKGROUND OF THE INVENTION

In the operation of fast-neutron nuclear reactors, the cooling liquid of which generally consists of a liquid metal, such as sodium, it is necessary to carry out handling operations on fuel assemblies or mechanical components submerged in the liquid cooling metal of the reactor contained in the reactor vessel. It may also be necessary to conduct handling operations on fuel assemblies or mechanical components arranged in capacities filled with liquid sodium and associated with the reactor vessel. These handling operations can be necessary especially for ensuring the storage of irradiated fuel assemblies or the replacement of assemblies in the reactor core.

In a reactor, the upper level of the liquid metal is surmounted by a gaseous atmosphere generally consisting of an inert gas, liquid metals, such as sodium, being extremely reactive and liable to burst into flames spontaneously in contact with oxygen.

Outside the sector of nuclear reactors using a liquid metal coolant, it may be necessary to carry out handling operations alternating between a cold-gas zone and a zone containing a hot liquid, thus risking impairing the functioning of the grab.

There are known grabs of the mechanical type comprising gripping fingers which can be controlled remotely in order to carry out the pick-up or release of an object, such as a fuel assembly.

Such grabs can be designed to function when they are submerged in a liquid metal, such as sodium.

At least some of the components forming the grab, particularly its gripping members are constantly submerged in the liquid sodium and function at a temperature higher than the solidification temperature of this liquid metal.

Such mechanical grabs can, of course, also be designed to be used in a gaseous atmosphere. They are never submerged.

However, as regards operations for handling objects, such as fuel assemblies, submerged in a hot liquid metal, for example in order to extract these objects from the liquid metal and remove them into a zone occupied by a gaseous atmosphere at a temperature below the solidification temperature of the liquid metal, it is not possible to use these mechanical grabs because liquid metal is liable to settle and solidify on the movable members of the grab, at the moment when the grab passes from a position submerged in the liquid metal to an emerged position in which the grab is plunged into a gaseous atmosphere the temperature of which is below the solidification temperature of the liquid metal. The solidification of the liquid metal on the movable members of the grab can result in defective functioning of this grab, and especially in failure of the fingers of the grab to open and to release the object which is being handled.

To carry out handling operations on objects, such as fuel assemblies, submerged in a liquid metal, two different grabs are generally used, the handling operations taking place in two stages.

A first grab, functioning solely under hot conditions at a temperature above the solidification temperature of the liquid metal, makes it possible to pick-up of the head of the assembly below the level of the liquid metal and to lift the same head so as to place it in a emerged position emerged above the level of the liquid metal, and to release the head in a zone containing hot gas.

A second grab, functioning solely in a hot or cold gaseous atmosphere and therefore not being submersible, is then used in order to conduct a second handling operation which involves again picking up the head of the assembly previously taken out of the liquid metal. The second grab subsequently carries out the lifting and handling of the fuel assembly in the gaseous atmosphere.

The disadvantage of this technique is that it requires the use of two different handling means during two successive phases of the handling operation.

There are known mechanical grabs consisting of a tubular body which is connected at one of its ends to a lifting means and in which are mounted gripping means, such as catching claws, movable in the radial direction of the tubular body between a position for picking up and a position for releasing the object which is being handled. A slide mounted slideably in the axial direction of the tubular body and connected to axial displacement means makes it possible to actuate the gripping means of the grab remotely.

However, such a device has never been designed so as to be capable of displacing an object between a position submerged in liquid metal and a position emerged in a hot or cold atmosphere.

The summary of the invention therefore, to provide a grab for lifting and displacing an object between a position submerged in a hot liquid, such as a molten metal, and a position emerged in a gaseous atmosphere, the grab comprising a body of tubular shape connected to a lifting means and a slide mounted slideably in the axial direction within the tubular body as well as means for gripping the object, which means are mounted within the tubular body and which are radially movable between a position for picking up and a position for releasing the object, the radial displacement of the gripping means being obtained as a result of the axial displacement of the slide within the tubular body, this grab being capable of functioning satisfactorily within the hot liquid and in a gaseous atmosphere during successive phases of the operation.

To this end, the tubular body of the grab according to the invention has a bell-shaped open end part, within which the slide is connected to the inner surface of the tubular body over its entire periphery by means of an axially deformable gas-tight elastic member, the gripping means being arranged within the bell-shaped end part of the tubular element between the elastic member ensuring its closure and its open end, so that, during the introduction of the lower part of the tubular body into the hot liquid in order to carry out the pickup and displacement of the object, gas is trapped inside the bell and forms a reserve, in which the gripping means are plunged during the pick-up and displacement of the object below the level of the hot liquid.

BRIEF DESCRIPTION OF THE DRAWINGS

To make it facilitate understanding of the invention, an embodiment of a lifting and handling grab according to the invention and its use for carrying out handling operations on fuel assemblies in the vessel of a fast-neutron nuclear reactor will now be described by way of example, with reference to the accompanying drawings.

DETAILED DESCRIPTION

Figure 1:
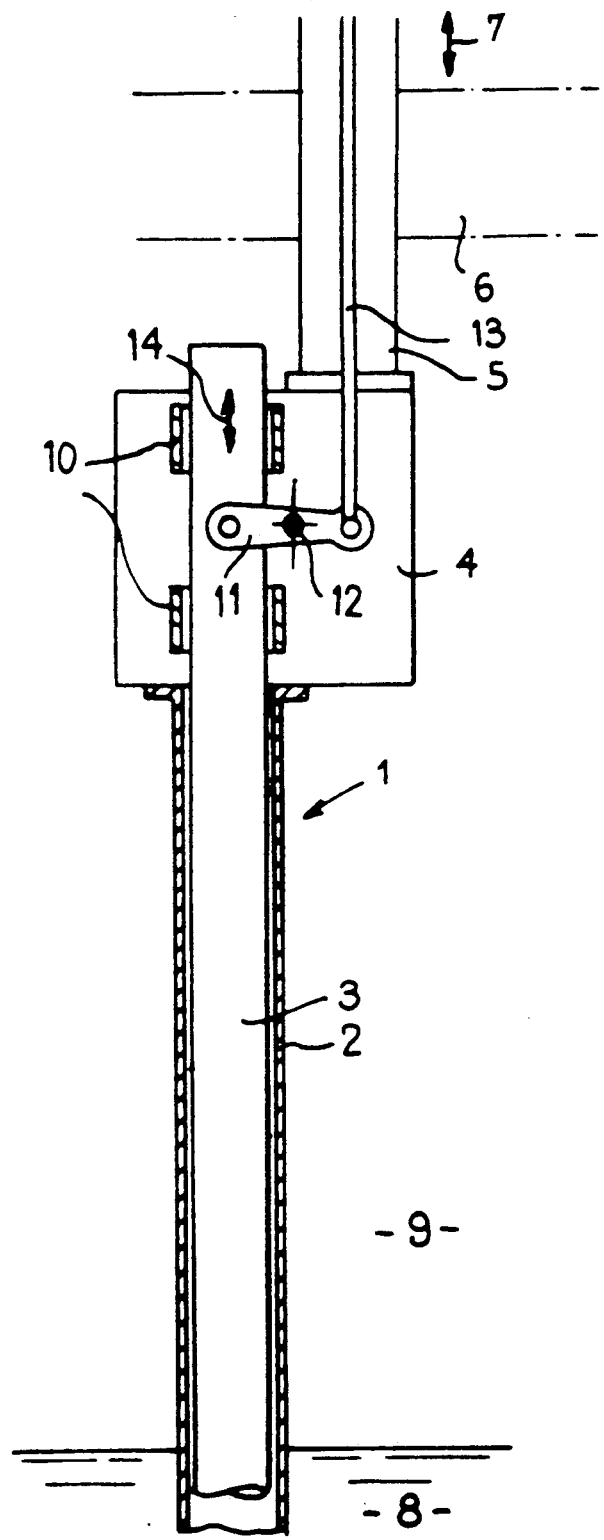
FIG. 1 is a partially sectional elevation view of the upper part of the lifting and handling grab.

FIG. 1 shows the upper part of the lifting and handling grab 1.

The grab 1 mainly comprises an outer tubular body 2 and a slide 3 arranged coaxially within the tubular body 2 with some radial play, the outside diameter of the slide 3 being substantially smaller than the inside diameter of the tubular body 2.

The upper part of the tubular body 2 is connected to a housing 4 fixed to the lower part of a lifting mast 5 of tubular shape which can be actuated in order to carry out the vertical raising or lowering of the grab as a whole by means of a device, such as a winch, (not shown in FIG. 1) connected to the upper part of the mast 5.

Preferably, the lifting mast 5 is associated with the fuel-loading machine of the nuclear reactor in which the lifting grab is used, the mast 5 passing through a rotary plug 6 mounted rotatably on the horizontal closing slab of the reactor vessel.

The winch is, in this instance, mounted on the frame of the fuel-loading machine. This device makes it possible to displace the mast 5 and the lifting grab 1 as a whole vertically upwards or downwards (in the direction indicated by arrow 7).

The reactor vessel contains liquid sodium 8 surmounted by a gaseous atmosphere 9 consisting of an inert gas, such as argon.

The housing 4 and the upper part of the tubular body 2 and of the slide 3 remain constantly plunged in the gaseous atmosphere 9. The lower part of the lifting grab 1 is introduced into the liquid sodium 8 in order to carry out the pick-up and handling of fuel assemblies located in the reactor core and submerged below the level of the sodium.

The upper end part of the slide 3 located above the upper end of the tubular body 2 is engaged in the housing 4 and mounted slideably in the housing 4 by means of bearings 10.

The upper part of the slide 3 is likewise connected in an articulated manner to two links 11 mounted pivotably on the housing 4 by means of an axle 12. The end of the links 11 opposite the slide 3 is connected in an articulated manner to an actuating rod 13 arranged along the axis of the lifting mast 5. Any other mechanical system causing relative axial movement between the slide 3 and the tube 2 can be used.

The upper end part of the actuating rod 13, (not shown in FIG. 1) is accessible from the platform of the fuel-loading machine, to which the upper part of the mast 5 is connected, in order to make it possible to displace the rod 13 vertically upwards or downwards so as to displace the slide 3 in the vertical direction, as indicated by the arrow 14.

Figure 2A:
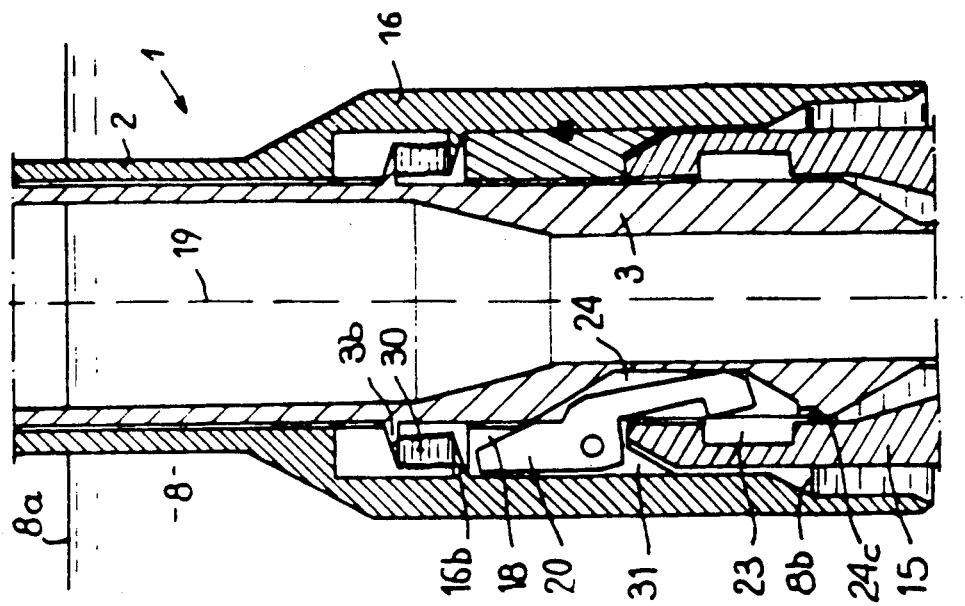
FIG. 2A is a sectional view of the lower part of the grab in position for picking up a fuel assembly in a position submerged in a liquid metal.
Figure 2B:
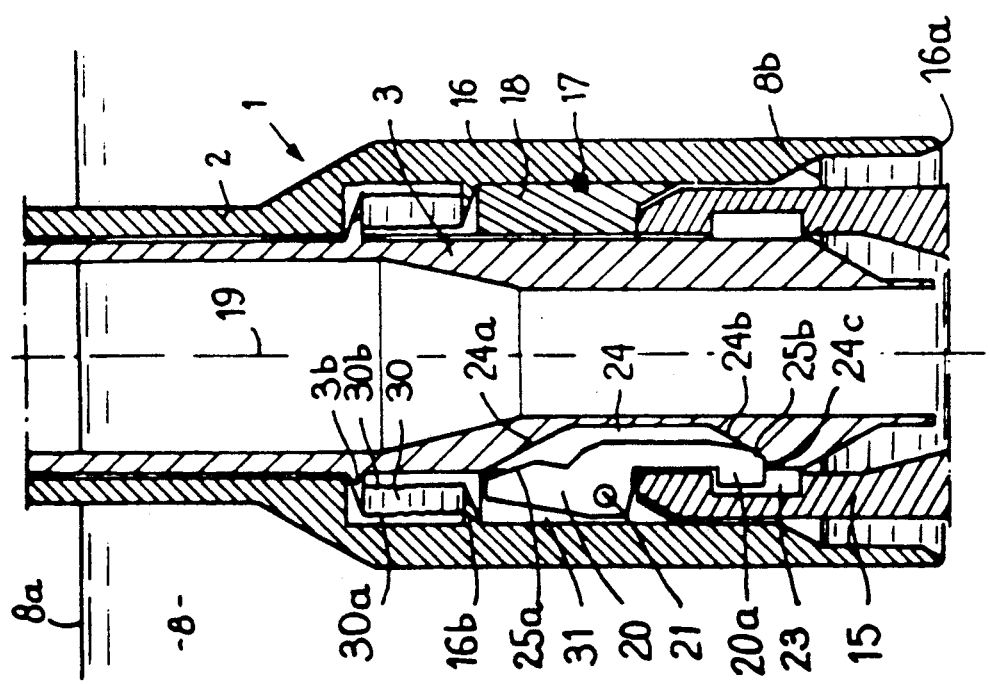
FIG. 2B is a sectional view of the lower part of the lifting and handling device in the position for releasing the fuel assembly submerged in the liquid metal.

FIGS. 2A and 2B illustrate the lower part of the lifting and handling grab 1 submerged in the liquid sodium 8 contained in the reactor vessel and in a position above the head 15 of a fuel assembly of the reactor core making it possible to pick up this assembly by the gripping means of the grab.

The diametrically widened lower part of the tubular body 2 of the grab 1 forms a bell 16 open at its lower end 16a.

An annular supporting piece 18 is fastened in the inner bore of the bell 16 by means of a key or ring 17. The annular supporting piece 18 has longitudinal slots, in each of which is arranged a pawl 20, mounted pivotably on a axle 21 transversely mounted in the slot of the support 18.

Preferably, three pawls 20 arranged at 120° relative to one another about the axis 19 of the tubular body 2 are mounted in slots of the support 18 arranged at 120° relative to one another about the axis 19 of the tubular body 2 and of the bell 16.

Each of the pivoting pawls 20 has a lower catching part 20a which, in the pick-up position of the grab, as shown in FIG. 2A, is engaged in a groove 23 machined in the inner bore of the assembly head 15.

The slide 3 tubular and in its lower part has a zone, in which the wall of the tubular casing of the slide is substantially greater than the thickness of the wall of the slide in its running part.

In this part of increased thickness are machined cavities, 24 having upper and lower parts delimited and by respective ramps 24a and 24b inclined relative to the axis 19 in one direction and the other.

As can be seen in FIGS. 2A and 2B, when the slide 3 is engaged within the tubular body 2, the cavities 24 come level with pawls 20 in order to ensure their actuation.

Each of the pawls 20 comprises an upper actuating ramp 25a and a lower ramp 25b forming the inner part of the catching end 20a of the finger 20.

Furthermore, the ramps 24b of the cavities 24 terminate towards the outside of the slide 3 in a bearing rim 24c substantially perpendicular to the axis 19 common to the tubular body 2 and to the slide 3.

When the pawls are in their pick-up position, as shown in FIG. 2A, the downward displacement of the slide 3 within the tubular body 2, which can be controlled by the actuating rod 13, causes the ramps 24a and 25a to come in contact with one another, thereby bringing about the tilting of the upper part of each of the pawls 20 towards the outside of the grab so as to reach the opening position of the pawls, shown in FIG. 2B. The lower part 20a is then located in the cavity 24 outside the groove 23.

Conversely, upward displacement of the slide 3 causes inward displacement of the upper part of the pawls 20 as a result of the interaction of the ramps 24b and 25b. The pawls 20 engage with their catching part 20a into the groove 23 of the assembly head 15.

The upward displacement of the slide stops when the bearing rim 24c of the slide comes into abutment with the lower edge of the catching part 20a of the fingers 20. The grab 1 can then be raised by means of the lifting mast 5 and the housing 4 which are shown in FIG. 1. The catching part 20a of the pawls 20 comes to bear on the upper rim of the groove 23, with the result that, during lifting, the weight of the assembly is supported by the slide 3, on which the assembly head 15 bears by means of the catching parts 20a of the pawls 20.

According to the particular design of the control of the grab, during lifting the assembly can also be supported redundantly by the bell-shaped lower part 16 of the tubular body 2 by means of the pawls 20 and their pivot axles 21.

The structure and operating characteristics of the control mechanism of the grab 1, as described above, resulting in radial displacement of the pawls by tilting under the effect of the axial displacement of a slide within the structure carrying the pawls, are wellknown in the art, and this type of grab can be used either to carry out handling operations on assemblies plunged in liquid sodium or to conduct handling operations on assemblies arranged in a gaseous atmosphere at a temperature substantially below the solidification temperature of the liquid metal.

However, the devices according to the prior art do not make it possible to execute the displacement of an object, such as a fuel assembly, between a position submerged in a liquid metal and a position emerged in a gaseous atmosphere at a temperature below the solidification temperature of the liquid metal, the pawls and their control mechanism being submerged in the liquid metal during the operation of picking up the assembly. As a result, the pawls and control mechanism are liable to retain liquid metal while the fuel assembly is being raised above the level of the liquid metal, the pawls and the control mechanism then being in a gaseous atmosphere at a temperature below the solidification temperature of the liquid metal. The solidification of the liquid metal retained by the pawls and the control mechanism may thus prevent opening of the fingers.

According to the lower part of the grab is arranged within the widened part 16 of the tubular casing 2 forming a bell; the bell 16 is closed sealingly by means of an axially deformable element making the junction between the slide and the inner surface of the bell 16.

The deformable element 30 consists of a bellows comprising two corrugated coaxial envelopes 30a and 30b succeeding one another in the axial direction. The corrugated walls of the bellows may be made for example, of stainless steel.

The upper part 16b of bell 16 projects radially inwards in relation to its inner surface, this projecting part 16b having the form of a collar, the triangular cross-section of which can be seen in FIGS. 2A and 2B.

The outer surface of slide 3 has a part 3b projecting radially outwards and having the form of a collar, the triangular cross-section of which can be seen in FIGS. 2A and 2B. The ends of double-envelope bellows 30 are seatingly welded to the collars 3b and 16b.

Thus, the upper portion of the annular space 31 contained between the inner surface of the bell 16 and the outer surface of the slide 3 is closed sealingly by means of bellows 30.

The support 18 and the pawls 20 are fastened on the inside of the bell 16 in the annular space 31, in an intermediate axial position between bellows 30 and the lower open end 16a of the bell 16.

Despite the presence of a sealing junction element between the slide 3 and the tubular body 2, the slide can be displaced axially in order to actuate of the pawls, as can be seen in FIGS. 2A and 2B. During the downward displacement of the slide in order to open the pawls, bellows 30 is compressed, as can be seen in FIG. 2B.

The bellows expands as a result of elasticity during the upward displacement of the slide 3 carrying out the closing of the pawls, as shown in FIG. 2A.

The tubular slide 3 can be used for blowing cooling gas into an assembly, on which the grab is engaged, during operations of handling the assembly above the level of the liquid metal.

To carry out the pick-up of an assembly below the level of the liquid metal, the grab 1 is displaced by means of the lifting mast 5 from a position located above the level of the liquid metal to the position shown in FIG. 2B, in which the bell caps the head 15 of an assembly, the being in its low position and the bellows 30 being compressed.

The positioning of the bell 16 on the assembly head 15 is made easier by the fact that the bell 16 has a lower part of widened diameter and that its lower end 16a is chamfered inwards.

During the descent of the lifting grab in the gaseous atmosphere surmounting the liquid metal, inert gas, such as argon, fills the annular space 31 and the inner volume of the tubular slide 3.

When the lower parts of the bell 16 and of the slide 3 penetrate below the level 8a of the liquid metal 8, the gas contained in the annular space 31 is trapped between the level of the liquid metal and the sealing bellows 30, this gas being incapable of escaping upwards.

By contrast, the gas contained in the inner volume of the slide 3 can escape on the inside of the slide whose upper part is connected to a cooling-gas blowing device.

During the descent of the grab 1 in the liquid metal, the gas contained in the annular space 31 is compressed, in such a way that the level 8b of the liquid metal in the annular space 31 remains below the lower part 20a of pawls 20 and the bearing rim 24c of the slide 3.

Pawls 20 and their control means therefore constantly remain plunged in a gaseous atmosphere during positioning of the grab on the assembly head 15 and during the actuation of pawls 20.

Pawls 20 and their control mechanism therefore incapable of coming in contact with liquid metal which could solidify on the movable parts of the pawls.

It will be clear that, during the lifting of the assembly in the liquid metal, pawls 20 remain in a gaseous atmosphere, and the gas contained in the annular space 31, which undergoes some expansion, cannot escape via the lower part of the bell 16.

The assembly can therefore be displaced by means of the lifting grab 1 between its submerged position and a position emerged in the gaseous atmosphere located above the level of the liquid metal, without this maneuver being accompanied by a solidification of liquid metal on the movable parts of the grab.

The assembly can consequently be displaced and handled from its submerged position by the sole use of the lifting grab 1 which can function successively in the liquid metal and in the gaseous atmosphere surmounting the liquid metal.

During the submersion of the grab 1 in the liquid metal, the level of the liquid metal within the slide remains identical to the upper level 8a of the liquid metal in the reactor vessel.

The lifting grab according to the invention thus makes it possible to carry out simply and quickly handling operations involving displacing fuel assemblies from a position submerged in a liquid metal to an emerged position, in which the fuel assembly is plunged in a gaseous atmosphere surmounting the liquid metal.

The deformable elastic member may be other than the double-envelope bellows described above.

The pawls of the grab and their control means may also have a form different from that described.

The slide may consist of a simple solid piece, to the periphery of which is fastened one of the ends of the deformable elastic member fastened at its other end to the inner surface of the bell.

As described in FR-A-2,431,907, the slide may be associated with a latch of variable orientation which is articulated on this slide and the orientation of which is modified in a low position of the slide by a stationary finger fixed to the tubular body, such orientation bringing the latch either into a released position or into a locked position, depending on its previous orientation. The lifting cable of the grab is connected to the slide on which the tubular body rests. When the tubular body comes to bear on the object being handled, the slide can be displaced in the tubular body into its low position as a result of gravity. In this case, the grab as a whole has only a lifting cable ensuring actuation of the slide and the transport of the tubular body and of the load.

The grab according to the invention can be used for conducting any operation of handling any object, such as a mechanical component, to ensure its displacement between a position submerged in a liquid metal or other hot liquid and an emerged position in which the object is plunged at least partially in a gaseous atmosphere.

The grab according to the invention can be employed outside the sector of nuclear reactors cooled by liquid for example in uses involving a bath of molten salts.

It is clear that the lifting grab can be associated with handling means making it possible to displace the object not only in the vertical direction, but also in one or more horizontal directions.

I claim:

1. Grab for lifting and displacing a object between a position submerged in a hot liquid and a position emerged in a gaseous atmosphere, said grab comprising a tubular body for axial sliding movement connected to a lifting means for gripping said object which said tubular body as well as means for gripping said object which are mounted within said tubular body and which are radially movable between a position for picking up and a position for releasing said object, radial displacement of said gripping means being obtained as a result of said axial movement of said slide within said tubular body, wherein
   (a) said tubular body comprises a bell-shaped open end part, within which said slide is connected to an inner surface of said tubular body over an entire periphery of said tubular body by means of an axially deformable gas-tight elastic member; and
   (b) said gripping means comprise pawls mounted pivotably on a support fastened to an inside of said bell-shaped open end part, said pawls being arranged within the bell-shaped open end part between said elastic member ensuring its closure and its open end, so that, during introduction of a lower part of said tubular body into said hot liquid in order to carry out pick-up and displacement of said object, gas is trapped inside said bell-shaped open end part and forms a reservoir in which said pawls are located during said pick-up and displacement of said object below the level of hot liquid.

2. Grab according to claim 1, wherein an annular space is formed between the inner surface of said bell-shaped open end and an end part of said slide located within said bell-shaped open end part, said annular space having a first end delimited by said deformable sealing member, said pawls of said grab being arranged in said annular space.

3. Grab according to claim 1, wherein said slide is tubular to allow cooling of an object on which said grab is engaged during handling of said object above the level of said hot liquid.

4. Grab according to claim 1, wherein said deformable sealing member comprises a bellows having corrugations succeeding one another in an axial direction.

5. Grab according to claim 4, wherein said bellows comprises two cylindrical and coaxial envelopes.

6. Grab according to claim 1, wherein said deformable sealing member has a first end fastened to an annular inwardly projecting part of an inner surface of said bellow-shaped open end part and a second end fastened to an annular outwardly projecting part of an outer surface of said slide.

7. Grab according to claim 1, wherein said slide comprises at least two actuating ramps inclined relative to an axis of said slide and of said tubular body and coming into contact with actuating surfaces of said pawls during axial displacement of said slide, in order to ensure pivoting and radial outward and inward displacement of said pawls, so as to carry out pick-up and release of said object.

* * * * *